United States Patent [19]

Nikles

[11] 3,818,012
[45] June 18, 1974

[54] 1,2-DIHYDRO-8-CARBAMOYLOXYQUINOLINES

[75] Inventor: Erwin Nikles, Liestal, Switzerland

[73] Assignee: Ciba-Geigy AG, Basel, Switzerland

[22] Filed: Sept. 7, 1971

[21] Appl. No.: 178,427

[30] Foreign Application Priority Data
Sept. 10, 1970  Switzerland...................... 13491/70
Aug. 4, 1971    Switzerland...................... 11467/71

[52] U.S. Cl............ 260/283 CN, 71/94, 260/283 P, 260/283 SY, 260/286 R, 260/287 R, 260/287 OX, 424/258
[51] Int. Cl............................................. C07d 33/40
[58] Field of Search .................. 260/287 R, 283 CN

[56] References Cited
UNITED STATES PATENTS

| | | | |
|---|---|---|---|
| 2,566,723 | 9/1951 | Gardner.......................... | 260/287 R |
| 3,088,916 | 5/1963 | Roman............................ | 260/289 R |
| 3,149,117 | 9/1964 | Brown............................. | 260/287 R |
| 3,362,960 | 1/1968 | Hodel.............................. | 260/287 R |
| 3,384,538 | 5/1968 | Hodel.............................. | 260/287 R |
| 3,538,099 | 11/1970 | Rohr .............................. | 260/287 R |
| 3,539,578 | 11/1970 | Brown............................ | 260/287 R |

*Primary Examiner*—Donald G. Dads
*Attorney, Agent, or Firm*—Harry Falber; Frederick H. Rabin

[57] ABSTRACT

Heterocyclic compounds of the formula

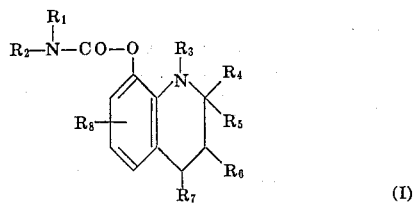

(I)

wherein $R_1$ is hydrogen, $C_1$–$C_4$ alkyl, $C_3$–$C_5$ alkenyl or $C_3$–$C_5$ alkinyl, $R_2$ is hydrogen, $C_1$–$C_4$ alkyl or optionally substituted $C_1$–$C_6$ acyl, $R_3$ is hydrogen, $C_1$–$C_6$ alkyl optionally substituted by $C_1$–$C_4$ alkoxy groups or cyano, $C_3$–$C_5$ alkenyl or $C_3$–$C_5$ alkinyl, $R_4$ and $R_5$ are each hydrogen or $C_1$–$C_4$ alkyl, $R_6$ and $R_7$ are each hydrogen or $C_1$–$C_4$ alkyl or together are a further bond between the C atoms to which they are attached in the heterocyclic ring, and $R_8$ is hydrogen, $C_1$–$C_4$ alkyl or halogen, The compound being in the form of the free base or of an acid addition salt thereof, processes for their manufacture and use as agents for pest control.

13 Claims, No Drawings

1,2-DIHYDRO-8-CARBAMOYLOXYQUINOLINES

This invention relates to heterocyclic compounds, and particularly to 1,2-dihydro-8-carbamoyloxy quinolines, 1,2,3,4-tetrahydro-8-carbamoyloxy quinolines, processes for their manufacture and use, either as free quinoline bases, as salts or suitably formulated, as agents for pest control.

According to the present invention there is a compound of the formula

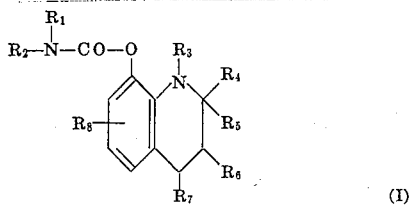

(I)

wherein $R_1$ is hydrogen, $C_1$–$C_4$ alkyl, $C_3$–$C_5$ alkenyl or $C_3$–$C_5$ alkinyl, $R_2$ is hydrogen, $C_1$–$C_4$ alkyl or optionally substituted $C_1$–$C_6$ acyl, $R_3$ is hydrogen, $C_1$–$C_6$ alkyl optionally substituted by $C_1$–$C_4$ alkoxy groups or cyano, $C_3$–$C_5$ alkenyl or $C_3$–$C_5$ alkinyl, $R_4$ and $R_5$ are each hydrogen or $C_1$–$C_4$ alkyl, $R_6$ and $R_7$ are each hydrogen or $C_1$–$C_4$ alkyl or together are a further bond between the C atoms to which they are attached in the heterocyclic ring, and $R_8$ is hydrogen, $C_1$–$C_4$ alkyl or halogen, the compound being in the form of the free base or of an acid addition salt thereof.

The term halogen includes fluorine, chlorine, bromine and iodine.

Preferred among the compounds of the invention are those in which:

$R_1$ is hydrogen, methyl, ethyl, n-propyl, isopropyl, allyl, crotyl, methallyl, propargyl, 2-butinyl, 3-butin-2-yl, 1,1-dimethyl-2-propin-1-yl, $R_2$ is hydrogen, methyl, ethyl, n-propyl, isopropyl, or is optionally chloro or bromo substituted acetyl, propionyl, butyryl, capryl or isomers thereof, $R_3$ is hydrogen, optionally methoxy, ethoxy or CN-substituted methyl, ethyl, n-propyl, isopropyl, n-butyl, isobutyl, or sec. butyl, or is allyl, methallyl, crotyl, propargyl, 2-butinyl, 3-butin-2-yl or 1,1-dimethyl-2-propin-1-yl, $R_4$ and $R_5$ are each hydrogen, methyl, ethyl or n-propyl, or one of the two of them can be isopropyl, $R_6$ and $R_7$ are hydrogen, methyl, ethyl or a further bond between the two carbon atoms to which they are joined in the heterocyclic ring, and $R_8$ is hydrogen, methyl, ethyl, chlorine or bromine, these compounds being in the form of free bases or acid addition salts.

Both inorganic and organic acids can form salts with the free amine of Formula I. Both neutral salts and acid salts may be formed.

Suitable inorganic acids are hydrochloric acid, hydrobromic acid, sulphuric acid, phosphoric acid, arsenic acid, hydriodic acid, nitric acid, perchloric acid and others.

Suitable organic acids are, for example, low aliphatic optionally halo-substituted mono- and dicarboxylic acids such as acetic acid, mono- di- and trichloroacetic acid, propionic acid, α-chloropropionic acid, maleic acid, pivalic acid, benzene sulphonic acid, p-toluenesulphonic acid, naphthaline sulphonic acid, methane sulphonic acid, sulphamic acid and others.

In certain cases, the stability of the carbamate is increased by the formation of acid addition salts.

The compounds of Formula I have strong biocidal action against insects, arachnids and worm pests such as nematodes. The effectiveness extends above all to pest types of the orders *Saltatoria* (*Teltigonidae, Gryllidae, Gryllotalpidae*), *Blattaria, Heteroptera* (*Reduviidae, Phyrrhocoriae, Cimidae*), *Homoptera* (*Cicacina, Aphidina, Pseudococcidae, Coccina*), *Hymenoptera, Coleoptera* (*Scarabaeidae, Dermestidae, Coccinellidae, Tenebrionidae, Chrysomelidae, Bruchidae*), *Lepidoptera* (*Tineidae, Noctuidae, Lymantriidae, Pyralidae*), *Diptera* (*Culicidae, Tipulidae, Stomoxydae, Trypetidae, Muscidae, Calliphoridae*), *Aphaniptera* (*Pulicidae*) as well as of the order *Acarina* (*Ixodidae, Argasidae, Tetranychidae, Dermanyssidae*).

Generally, the compounds are effective against all development stages such as eggs, larvae, nymphs or pupae and adults or imagos.

Plant pathogenic bacteria and fungi can also be combated with the compounds of Formula I, even those which attack the plants from the soil and cause trachaeomycoses. Inter alia, these are representatives of the genus:

Alternaria
Aphanomyces
Botrytis
Cercosporella
Fusarium
Helminthosporium
Olpidium
Ophiobolus
Phoma
Phytophthora
Pythium
Rhizoctonia
Sclerotinia
Sclerotium
Thielavia
Thielaviopsis
Verticillium Among the nematodes, there should be mentioned, for example: *Aphelenchus ritzemabosi, Aphelenchus fragariae, Aphelenchus oryzae, Ditylenchus dipsaci, Meloidogyne arenaria, Meloidogyne incognita, Heterodera rostochiensi, Heterodera schachtii* or *Paratylenchus, Xiphinema* and *Rhadopholus*.

The compounds of Formula I work partly in a chemosterilizing way against insects.

Thereby, plant-influencing properties are observed, which can change the morphology of the plant or its development cycle, or they can even be effective as herbicides.

Molluscs, especially snails which are schistosome transfer agents, are killed by compounds of Formula I.

The principal area of use of the compounds noted is, however, the combating of insects, acarina and nematodes.

The compounds of Formula I can be used, for example, against aphids such as the peach-potato aphid (*Myzus persicae*) and the black bean aphid (*Doralis fabae*); scale insects such as *Aspidiotus hederae, Lecanium hesperidium, Pseudococcus maritimus; Thysanoptera*, such as *Hercinothrips femoralis*, and bugs such as the beet bug (*Piesma quadrata*) or the bed bug (*Cimex lectularus*); moth and butterfly grubs such as *Plutella maculipennis, Lymantria dispar;* and particularly beetles such as the grain weevil (*Sitophilus granarius*), Colorado beetle (*Leptinotarsa decemlineata*) Mexican bean weevil (*Epilachna varivestis*); and types living in the soil such as wire worms (*Agriotes* sp.) or white grubs (*Melolontha melolontha*); Orthoptera such as the German cockroach (*Blattella germanica*); and the house cricket (*Acheta domesticus*); termites, such as *Reticulitermes;* Hymenoptera, such as ants; Lepidoptera such as *Chilo suppressalis;* Diptera, such as the fruit fly (*Drosophila melanogaster*), the Mediterranean fruit fly (*Ceratitis capitata*), the house fly (*Musca domestica*) as well as midges and mosquitoes, e.g. (*Aedes aegypti* and *Anopheles stephensi*).

Compounds of Formula I are particularly effective in combating representatives of the order Acarina, such as, for example *Eulaelaps, Echinolaelaps, Laelaps, Haemogamasus, Dermanyssus, Ornithonyssus, Allodermanyssus*, particularly *Allodermanyssus sanguineus, Pneumonyssus, Amblyomma, Aponomma, Boophilus, Dermacentor, Haemophysalis, Hyalomma, Ixodes, Margaropus, Rhipicephalus, Ornithodorus; Otobius, Cheyletidae,* e.g. *Cheyletus, Psorergates, Demodicidae, Trombiculidae,* e.g. *Tromicula, Eutrombicula, Schongastia, Acomatacurus, Neoschongastia, Euschongastia, Sarcoptiformes* e.g. *Notoedres, Sarcoptes, Knemidokoptes, Psoroptidae,* e.g. *Psoroptes, Chorioptes, Otodectes* and *Tetranychidae* e.g. *Tetranychus telarius; Tetranychus urticae.*

A particularly important group of compounds included in Formula I are those of the formula

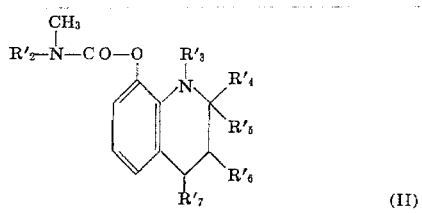

(II)

wherein $R'_2$ is hydrogen or methyl, $R'_3$ is hydrogen, methyl, methoxymethyl, ethoxymethyl, cyanomethyl, β-cyanoethyl, ethyl or methoxyethyl, $R'_4$ is hydrogen or methyl, $R'_5$ is hydrogen, methyl or ethyl, and $R'_6$ and $R'_7$ are either both hydrogen or are a further bond between their respective C-atoms of the heterocyclic ring, together with their acid addition salts.

As suitable individual compounds for pest control, the following should be noted:
1,2-dihydro-2,2-dimethyl-8-quinolyl-N-methylcarbamate,
1,2-dimethyl-1,2,3,4-tetrahydro-8-quinolyl-N-methylcarbamate,
2-methyl-1,2,3,4-tetrahydro-8-quinolyl-N-methylcarbamate,
3-methyl-1,2,3,4-tetrahydro-8-quinolyl-N-methylcarbamate,
4-methyl-1,2,3,4-tetrahydro-8-quinolyl-N-methylcarbamate,
1,2-dimethyl-1,2,3,4-tetrahydro-8-quinolyl-N-methylcarbamate,
3,4-dimethyl-1,2,3,4-tetrahydro-8-quinolyl-N-methylcarbamate,
5-methyl-1,2,3,4-tetrahydro-8-quinolyl-N-methylcarbamate,
1,2-dihydro-1,2,2,-dimethyl-8-quinolyl-N-methylcarbamate,
1,2,3,4-tetrahydro-8-quinolyl-N-methylcarbamate,
1-allyl-2,2-dimethyl-1,2-dihydro-8-quinolyl-N-methylcarbamate,
2,2-dimethyl-1,2-dihydro-1(2-propinyl)-8-quinolyl-N-methylcarbamate,
1,2-dihydro-2,2-dimethyl-8-quinolyl-N,N-dimethylcarbamate,
1,2-dihydro-2,2,5-trimethyl-8-quinolyl-N-methylcarbamate,
1,2,3,4-tetrahydro-2,2,5-dimethyl-8-quinolyl-N-methylcarbamate,
1,2-dihydro-2,5-dimethyl-2-ethyl-8-quinolyl-N-methylcarbamate,
5-chlor-1,2-dihydro-2,2-dimethyl-8-quinolyl-N-methylcarbamate,
1-ethyl-1,2,3,4-tetrahydro-8-quinolyl-N-methylcarbamate,
1-allyl-1,2,3,4-tetrahydro-8-quinolyl-N-methylcarbamate,
1-allyl-1,2,3,4-tetrahydro-8-quinolyl-N-acetyl-N-methylcarbamate
1(2-propinyl)-1,2,3,4-tetrahydro-8-quinolyl-N-methylcarbamate,
1-cyanmethyl-1,2,3,4-tetrahydro-8-quinolyl-N-methylcarbamate,
1-cyanethyl-1,2,3,4-tetrahydro-8-quinolyl-N-methylcarbamate,
1-(2-methoxyethyl)-1,2,3,4-tetrahydro-8-quinolyl-N-methylcarbamate,
1-(3-chlorallyl)-1,2,3,4-tetrahydro-8-quinolyl-N-methylcarbamate
1-(2-chlorallyl)-1,2,3,4-tetrahydro-8-quinolyl-N-methylcarbamate,
2-methyl-1-n-propyl-1,2,3,4-tetrahydro-8-quinolyl-N-methylcarbamate,
1-n-butyl-2-methyl-1,2,3,4-tetrahydro-8-quinolyl-N-methylcarbamate,
1-allyl-2-methyl-1,2,3,4-tetrahydro-8-quinolyl-N-methylcarbamate,
2-methyl-1-(2-propinyl)-1,2,3,4-tetrahydro-8-quinolyl-N-methylcarbamate,
1,2,3,4-tetrahydro-8-quinolyl-N,N-dimethylcarbamate,
2-methyl-1,2,3,4-tetrahydro-8-quinolyl-N,N-dimethylcarbamate,
6-methyl-1,2,3,4-tetrahydro-8-quinolyl-N-methylcarbamate,
1,2-dihydro-2,2-dimethyl-8-quinolyl-N-acetyl-N-methylcarbamate,
1,2-dimethyl-1,2,3,4-tetrahydro-8-quinolyl-N-acetyl-N-methylcarbamate,
1-methyl-1,2,3,4-tetrahydro-8-quinolyl-N-acetyl-N-methylcarbamate,
1,2-dihydro-2,2-dimethyl-1-ethyl-8-quinolyl-N-methylcarbamate,
2-methyl-1-n-propyl-1,2,3,4-tetrahydro-8 -quinolyl-N,N-dimethylcarbamate.

The invention also relates to compounds of the formula

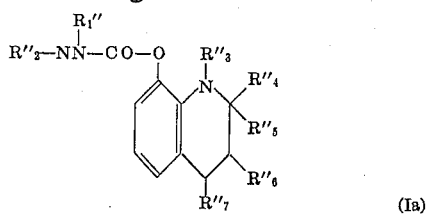

(Ia)

wherein $R''_1$ is hydrogen, $C_1$–$C_4$ alkyl, $C_3$–$C_5$ alkenyl or $C_3$–$C_5$ alkinyl, $R''_2$ is hydrogen, $C_1$–$C_4$ alkyl or optionally halosubstituted $C_1$–$C_6$ acyl, $R''_3$ is hydrogen, optionally $C_1$–$C_4$ alkoxy or cyano-substituted $C_2$–$C_6$ alkyl, or is $C_3$–$C_5$ alkenyl or $C_3$–$C_5$ alkinyl, $R''_4$ and $R''_5$ are hydrogen or $C_1$–$C_4$ alkyl, $R''_6$ and $R''_7$ are hydrogen or $C_1$–$C_4$ alkyl or together with their respective carbon atoms form a bond, and $R''_8$ is hydrogen, $C_1$–$C_4$ alkyl or halogen, the acid addition salts of these compounds being also included.

Worthy of particular mention are those compounds of Formula Ia in which $R''_1$, $R''_4$ and $R''_5$ are each hydrogen or methyl, $R''_2$ is methyl or acetyl, $R''_3$ is hydrogen, ethyl, propyl and isopropyl, n-butyl, sec. butyl, cyanomethyl, allyl, 2-chloroallyl, 3-chloroallyl or propargyl, $R''_6$ and $R''_7$ are each hydrogen or together are a further carbon-carbon bond, and $R''_8$ is hydrogen, methyl or chlorine.

The carbamates of Formula Ia can be prepared by known methods.

For example, a phenol of the formula

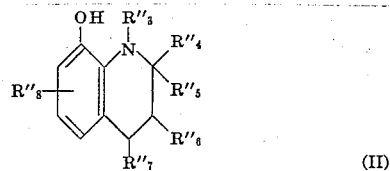

(II)

wherein $R''_3$ is not H and $R''_4$ to $R''_8$ have the meanings given for Formula I, can be reacted with an aliphatic isocyanate corresponding to $R_1$ or an aliphatic carbamic acid chloride corresponding to $R''_1$ and/or $R''_2$.

The carbamates of Formula I can also be obtained by reaction of a chlorocarbonate of the formula

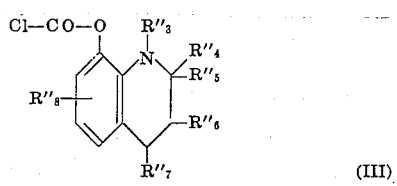

(III)

or of a bis [hydro-8-oxyquinolyl] carbonate of formula

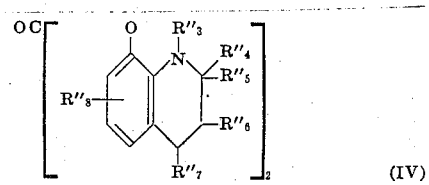

(IV)

with a corresponding amine of the formula

(V)

so long as $R''_3$ is not H. If, on the other hand, $R''_3$ is H, then the reactions given for Formulae II, III and IV no longer proceed clearly in the observed direction, on account of the reactivity of the free amine. In these cases it is expedient to react the aromatic 8-oxyquinoline derivative of the formula

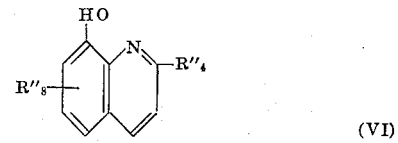

(VI)

corresponding to Formula II or its chlorocarbonate corresponding to Formula III or its bis-[8-oxyquinolyl] carbonate corresponding to Formula IV to give the carbamate, and then partially hydrogenating in the presence of Pd/C to the 1,2-dihydro or 1,2,3,4-tetrahydro derivative. In a few cases, an $R''_3$ substituent can also be introduced by quaternizing the ring nitrogen atom and then partially hydrogenating in the 1,2,-position or the 1,2,3,4-position in the presence of Pd/C.

The substituent $R''_5$ can be introduced inter alia with e.g. lithium organic compounds $LiR_5$.

1,2-dihydro-8-oxyquinolyl carbamates can be obtained suitably by cyclizing an O-alkinyl aminophenyl carbamate in the presence of Cu and/or cuprous salts, e.g. CuCl. Insofar as $R''_3$ is not H, then starting from the corresponding O-alkinyl aminophenol of the formula

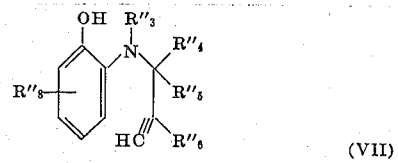

(VII)

this can be cyclized in the presence of Cu and/or cuprous salts and, as described above, converted into the desired carbamate.

1,2,3,4-tetrahydro-8-oxyquinolyl carbamates can also be obtained according to choice by subsequent hydration in the presence of Pd/C from 8-oxyquinolylcarbamates or from 1,2-dihydro-8-oxyquinolylcarbamates.

The compounds of Formula I can be used as pest control agents with at least one of the following additives: extenders, suspending agents, emulsifying agents, thickening agents, adhesives, wetting agents and or fertilizers, as well as optionally further pesticides or baits. Extenders are solid or liquid diluents. Among pesticides are included particularly insecticides, acaricides, nematocides, bactericides and fungicides.

Pest control agents, usually containing 0.1 to 95 percent by weight, preferably 1 to 90 percent by weight, of the new compounds of Formula I can take various forms, in dry or damp liquid or solid condition. Shaped carrier materials such as flycards or fly papers, paper strips or granulates can be impregnated with the active substances. By means of sprays a gaseous phase of the active material can be generated.

They can also be used in almost pure form without additives by using suitably finely dividing spraying apparatus in the area of use. Of principal importance here is spraying from aircraft.

For the manufacture of directly sprayable solutions of compounds of Formula I, for example, mineral oil fractions of high to average boiling range may be used, such as diesel oil or kerosene, coal tar oil and oils of vegetable or animal origin, also hydrocarbons such as alkylated naphthalines and tetrahydronaphthalene, optionally with the use of xylene mixtures, cyclohexanols, ketones and furthermore chlorinated hydrocarbons such as trichlorethane, trichlorethylene or tri and tetrachlorobenzenes. Advantageously, organic solvents boiling at over 100°C are used.

Aqueous application forms are particularly suitable prepared from emulsion concentrates, pastes or wettable powders by the addition of water. As emulsifying or dispersing agents there can be used non-ionic materials e.g. condensation products of aliphatic alcohols, amines or carboxylic acids having a long chain hydrocarbon group of about 10 to 20 carbon atoms with ethylene oxide, such as the condensation product of octadecyl alcohol and 25–30 mol ethylene oxide, that of technical oleylamine and 15 mol ethylene oxide, or that of dodecylmercaptan and 12 mol ethylene oxide. Among anionic emulsifiers which can be used, mention should be made of the sodium salt of dodecyl alcohol sulphuric acid ester, the sodium salt of dodecylbenzene sulphonic acid, the potassium or triethanolamine salt of oleic acid or abietic acid or mixtures of these acids, or the sodium salt of a petroleum sulphonic acid. As cationic dispersing agents there are quaternary ammonium compounds such as cetylpyridinium bromide or dioxyethyl dodecyl ammonium chloride.

For manufacturing dusting and spreading agents, talcum, kaolin, bentonite, calcium carbonate, calcium phosphate and even coal, cork flour, wood flour and other materials of vegetable origin can be used. The various use forms can be provided in known fashion with additive materials which improve distribution, adherence, rain resistance or penetration. These are, for example, fatty acids, resins, glues, caseins or alginates.

Dusts with a content of 5–10 percent by weight of active substance can be made by diluting such a wettable powder with a finely divided solid carrier. Wetting and dispersing agents may also be left out or replaced by others.

For combating ground insects, termites or rice pests in paddy fields, the use of granulates has proved to be very effective.

Such granulates can be very easily manufactured by dissolving an active substance according to Formula I in an organic solvent and applying the so obtained solution to a granulated material such as attapulgite, $SiO_2$, lime, bentonite etc. and then evaporating the organic solvent again.

Polymer granulates may also be used. They can be manufactured by mixing the active substance of Formula I with polymerizable compounds (urea/formaldehyde, dicyandiamide/formaldehyde, melamine/formaldehyde or others) whereafter careful polymerization is carried out which does not affect the active substance, and wherein during the gel-formation stage, granulation is carried out. It is more favourable to take ready-made porous polymer granules (urea/formaldehyde polyacrylonitrile, polyester or others) with a given surface and a favourable predetermined absorption/desorption ratio, to impregnate this with the active substance, e.g. in the form of a solution (in a low-boiling solvent) and to remove the solvent.

Such polymer granules can be used in the form of micrographulates of bulk density preferably of 300 to 600 g per litre, also with the aid of dusting apparatus. Dusting can also take place over extended crop fields with the aid of aircraft.

Naturally further pesticides, fertilizers, surface active agents or materials for increasing the specific gravity such as $BaSO_4$ can be added to the granulates.

Granulates can also be obtained by compacting the carrier material with active substance and additives and then disintegrating the compact.

The action of the phosphorus compound, according to the invention, can be increased by synergists. Suitable for this are, for example, sesamex, piperonyl cyclonene, piperonyl butoxide, piperonal bis [2-(2-butoxyethoxy) ethyl] acetate, sulphoxide, propyl isome, N-(2-ethylhexyl)-5-norbornen-2,3-dicarboxamide, octachlordipropylether, 2-nitrophenylpropargylether, 4-chlor-2-nitrophenylpropargylether, 2,4,5-trichlorphenyl-propargylether.

As examples for broadening the spectrum of activity of the compounds of the invention, the following insecticides, nematocides or acaricides are noted:

Bis-0,0-diethylphosphoric acid anhydride (TEPP)
Dimethyl (2,2,2-trichlor-1-hydroxyethyl) phosphonate (TRICHLORFON)
1,2-dibrom-2,2-dichlorethyldimethylphosphate (NALED)
2,2-dichlorvinyldimethylphosphate (DICHLORVOS)
2-methoxycarbamyl-1-methylvinyldimethylphosphate (MEVINPHOS)
Dimethyl-1-methyl-2-(methylcarbamoyl) vinylphosphate cis (MONOCROTOPHOS)
3-(dimethoxyphosphinyloxy)-N,N-dimethyl-cis-crotonamide (DICROTOPHOS)
2-chloro-2-diethylcarbamoyl-1-methylvinyldimethylphosphate (PHOSPHAMIDON)
0,0-diethyl-0(or S)-2-(ethylthio)-ethylthiophosphate (DEMETON)
S-ethylthioethyl-0,0-dimethyl-dithiophosphate (THIOMETON)
0,0-diethyl-S-ethylmercaptomethyldithiophosphate (PHORATE)
0,0-diethyl-S-2-ethylthio)ethyldithiophosphate (DISULFOTON)
0,0-dimethyl-S-2-(ethylsulphinyl)ethylthiophosphate (OXYDEMETONMETHYL)
0,0-dimethyl-S-(1,2-dicarbethoxyethyldithiophosphate (MALATHION)
0,0,0,0-tetraethyl-S,S'-methylene-bis-dithiophosphate (ETHION)
0-ethyl-S,S-dipropyldithiophosphate
0,0-dimethyl-S-(N-methyl-N-formylcarbamoylmethyl)-dithiophosphate (FORMOTHION)
0,0-dimethyl-S-(N-methylcarbamoylmethyl)dithiophosphate (DIMETHOATE)
0,0-dimethyl-0-p-nitrophenylthiophosphate (PARATHION-METHYL)
0,0-diethyl-0-p-nitrophenylthiophosphate (PARATHION)
0-ethyl-0-p-nitrophenylphenylthiophosphate (EPN)
0,0-dimethyl-0-(4-nitro-m-tolyl)thiophosphate (FENITROTHION)

0,0-dimethyl-0-2,4,-5-trichlorphenylthiophosphate (FENCHLORPHOS)
0-ethyl-0,2,4,5-trichlorphenylethylthiophosphate (TRICHLORONATE)
0,0-dimethyl-0-2,5-dichlor-4-bromphenylthiophosphate (BROMOPHOS)
0,0-dimethyl-0-(2,5-dichlor-4-jodphenyl)-thiophosphate (IODOFENPHOS)
4-tert. butyl-2-chlorphenyl-N-methyl-0-methylamidophosphate (CRUFOMATE)
0,0-dimethyl-0-(3-methyl-4-methylmercaptophenyl)-thiophosphate (FENTHION)
Isopropylamino-0-ethyl-0-(4-methylmercapto-3-methylphenyl)-phosphate
0,0-diethyl-0-p-(methylsulphinyl)phenyl-thiophosphate (FENSULFOTHION)
0-p-(dimethylsulfamido)phenyl 0,0-dimethylthiophosphate (FAMPHUR)
0,0,0',0'-tetramethyl-0,0'-thiodi-p-phenylenthiophosphate
0-ethyl-S-henyl-ethyldithiophosphate
0,0-dimethyl-0-(α-methylbenzyl-3-hydroxycrotony)-phosphate
2-chlor-1-(2,4-dichlorphenyl)vinyl-diethylphosphate (CHLORFENVINPHOS)
2-chlor-1-(2,4,5-trichlorphenyl)vinyl-dimethylphosphate
0-[2-chlor-1-(2,5-dichlorphenyl)]vinyl-0,0-diethylthiophosphate
Phenylglyoxylonitriloxim-0,0-diethylthiophosphate (P-HOXIM)
0,0-diethyl-0-(3-chlor-4-methyl-2-oxo-2-H-1-benzopyran-7-yl)-thiophosphate (COUMAPHOS)
2,3-p-dioxandithiol-S,S-bis(0,0-diethyldithiophosphate (DIOXATHION)
5-[(6-chlor-2-oxo-3-benzoxazolinyl)methyl]0,0-diethyldithiophosphate (PHOSALONE)
2-(diethoxyphosphinylimino)-1,3-dithiolane
0,0-dimethyl-S-[2-methoxy-1,3,4-thiadiazol-5-(4H)-onyl-(4)-methyl]dithiophosphate
0,0-dimethyl-S-phthalimidomethyl-dithiophosphate (IMIDAN)
0,0-diethyl-0-(3,5,6-trichlor-2-pyridyl)thiophosphate
0,0-diethyl-0-2-pyrazinylthiophosphate (THIONAZIN)
0,0-diethyl-0-(2-isopropyl-4-methyl-6-pyrimidyl)thiophosphate (DIAZINON)
0,0-diethyl-0-(2-chinoxalyl)thiophosphate
0,0-dimethyl-S-(4-oxo-1,2,3-benzotriazin-3(4H)-ylmethyl)-dithiophosphate (AZINPHOSMETHYL)
0,0-diethyl-S-(4-oxo-1,2,3-benzotriazin-3(4H)-ylmethyl)-dithiophosphate (AZINPHOSETHYL)
S-[(4,6-diamino-s-triazin-2-yl)methyl]-0,0-dimethyldithiophosphate (MENAZON)
0,0-dimethyl-0-(3-chlor-4-nitrophenyl)thiophosphate (CHLORTHION)
0,0-dimethyl-0(or S)-2-(ethykthioethyl)thiophosphate (DEMETON-S-METHYL)
2-(0,0-dimethyl-phosphoryl-thiomethyl)-5-methoxy-pyron-4-3,4-dichlorbenzyl-triphenylphosphoniumchloride
0,0-diethyl-S-(2,5-dichlorphenylthiomethyl)dithiophosphate (PHENKAPTON)
0,0-diethyl-0-(4-methyl-cumarinyl-7-)-thiophosphate (POTASAN)
5-amino-bis(dimethylamido)phosphinyl-3-phenyl-1,2,4-triazole (TRIAMIPHOS)
N-methyl-5-(0,0-dimethylthiolphosphoryl)-3-thiavaleramide (VAMIDOTHION)
0,0-diethyl-0-[2-dimethylamino-4-methylpyrimidyl-(6)]-thiophosphate (DIOCTHYL)
0,0-dimethyl-S-(methylcarbamoylmethyl)-thiophosphate (OMETHOATE)
0-ethyl-0-(8-quinolinyl)-phenylthiophosphate (OXINOTHIOPHOS)
0-methyl-S-methyl-amidothiophosphate (MONITOR)
0-methyl-0-(2,5-dichlor-4-bromphenyl)-benzothiophosphate (PHOSVEL)
0,0,0,0-tetrapropyldithiophosphate
3-(dimethoxyphosphinyloxy)-N-methyl-N-methoxy-cis-crotonamide
0,0-dimethyl-S-(N-ethylcarbamoylmethyl)dithiophosphate (ETHOATE-METHYL)
0,0-diethyl-S-(N-isopropylcarbamoylmethyl)-dithiophosphate (PROTHOATE)
S-N-(1-cyano-1-methylethyl)carbamoylmethyldiethyl-thiolphosphate (CYANTHOATE)
S-(2-acetamidoethyl)-0,0-dimethyldithiophosphate
Hexamethylphosphoric acid triamide (HEMPA)
0,0-dimethyl-0-(2-chlor-4-nitrophenyl)thiophosphate (DICAPTHON)
0,0-dimethyl-0-p-cyanophenyl thiophosphate (CYANOX)
0-ethyl-0-p-cyanophenylthiophosphonate 0,0-diethyl-0-2,4-dichlorphenylthiophosphate (DICHLORFENTHION)
0,2,4-dichlorphenyl-0-methylisopropylamidothiophosphate
0,0-diethyl-0-2,5-dichlor-4-bromphenylthiophosphate (BROMOPHOS-ETHYL)
Dimethyl-p-(methylthio)phenylphosphate
0,0-dimethyl-0-p-sulfamidophenylthiophosphate
0-[p-(p-chlorphenyl)azophenyl]0,0-dimethylthiophosphate (AZOTHOATE)
0-ethyl-S-4-chlorphenyl-ethyldithiophosphate
0-isobutyl-S-p-chlorphenyl-ethyldithiophosphate
0,0-dimethyl-S-p-chlorphenylthiophosphate
0,0-dimethyl-S-(p-chlorphenylthiomethyl)dithiophosphate
0,0-diethyl-p-chlorphenylmercaptomethyl-dithiophosphate (CARBOPHENOTHION)
0,0-diethyl-S-p-chlorphenylthiomethyl-thiophosphate
0,0-diethyl-S-(carbethoxy-phenylmethyl)dithiophosphate (PHENTHOATE)
0,0-diethyl-S-(carbofluorethoxy-phenylmethyl)Odithiophosphate
0,0-dimethyl-S-(carboisopropoxy-phenylmethyl)-dithiophosphate
0,0-diethyl-7-hydroxy-3,4-tetramethylene-coumarinyl-thiophosphate (COUMITHOATE)
2-methoxy-4-H-1,3,2-benzodioxaphosphorin-2-sulphide.
0,0-diethyl-0-(5-phenyl-3-isooxazolyl)thiophosphate
2-(diethoxyphosphinylimino)-4-methyl-1,3-dithiolane
Tris-(2-methyl-1-aziridinyl)-phosphine oxide (METEPA)
S-(2-chlor-1-phthalimidoethyl)-0,0-diethyldithiophosphate
N-hydroxynaphthalimido-diethylphosphate
Dimethyl-3,5,6-trichlor-2-pyridylphosphate
0,0-dimethyl-0-(3,5,6-trichlor-2-pyridyl)thiophosphate S-2-(ethylsulphonyl)ethyl dimethylthiolphosphate (DIOXYDEMETON-S-METHYL)

Diethyl-S-2-(ethylsulphinyl)ethyl dithiophosphate (OXYDISULFOTON)
Bis-0,0-diethylthiophosphoric acid anhydride (SULFOTEP)
Dimethyl-1,3-di(carbomethoxy)-1-propen-2-yl-phosphate
Dimethyl-(2,2,2-trichlor-1-butyroyloxyethyl)phosphate (BUTONATE)
0,0-dimethyl-0-(2,2-dichlor-1-methoxy-vinyl)phosphate
Bis-(dimethylamido)fluorphosphate (DIMEFOX)
3,4-dichlorobenzyl-triphenylphosphoniumchloride.
Dimethyl-N-methoxymethylcarbamoylmethyl-dithiophosphate (FORMOCARBAM)
0,0-diethyl-0-(2,2-dichlor-1-chlorethoxyvinyl)phosphate
0,0-dimethyl-0-(2,2-dichlor-1-chlorethoxyvinyl)phosphate
0-ethyl-S,S-diphenyldithiolphosphate
0-ethyl-S-benzyl-phenyldithiophosphonate
0,0-diethyl-S-benzyl-thiolphosphate
0,0-dimethyl-S-(4-chlorphenylthiomethyl)dithiophosphate (METHYLCARBOPHENOTHION)
0,0-dimethyl-S-(ethylthiomethyl)dithiophosphate
Diisopropylaminofluorphosphate (MIPAFOX)
0,0-dimethyl-S-(morpholinylcarbamoylmethyl)dithiophosphate (MORPHOTHION)
Bismethylamido-phenylphosphate
0,0-dimethyl-S-(benzene sulphonyl)dithiophosphate
0,0-dimethyl-(S and O)-ethylsulphinylethylthiophosphate
0,0-diethyl-0-4-nitrophenylphosphate
Triethoxy-isopropoxy-bis(thiophosphinyl)disulphide
2-methoxy-4H-1,3,2,benzodioxaphosphorin-2-oxide
Okta,ethylpyrophosphoramide (SCHRADAN)
Bis (dimethoxythiophosphinylsulphido)-phenylmethane
N,N,N',N'-tetramethyldiamidofluorphosphate (DIMEFOX)
0-phenyl-0-p-nitrophenyl-methanthiophosphonate (C-OLEP)
0-methyl-0-(2-chlor-4-tert. butyl-phenyl)-N-methylamidothiophosphate (NARLENE)
0-ethyl-0-2(2,4-dichlorphenyl)-phenylthiophosphonate
0,0-diethyl-0-(4-methylmercapto-3,5-dimethylphenyl)-thiophosphate
4,4'-bis-(0,0-dimethylthiophosphoryloxy)-diphenyldisulphide
0,0-di(β-chlorethyl)-0-(3-chlor-4-methyl-cumarinyl-7)phosphate
S-(1-phthalimidoethyl)-0,0-diethyldithiophosphate
0,0-dimethyl-0-(3-chlor-4-diethylsulphamylphenyl)-thiophosphate
0-methyl-0-(2-carbisopropoxyphenyl)-amidothiophosphate
5-(0,0-dimethylphosphoryl)-6-chlor-bicyclo(3.2.0)-heptadiene(1,5)
0-methyl-0-(2-i-propoxycarbonyl-1-methylvinyl)ethylamidothlophosphate.

The following examples will serve to illustrate the invention.

EXAMPLE 1

0-aminophenyl N-methylcarbamate

A solution of 196 parts 0-nitrophenyl-N-acetyl carbamate in 700 volumes of glacial acetic acid and in the presence of 2.4 parts 10 percent palladium carbon was shaken in a hydrogen atmosphere. After ending the hydrogen takeup, the catalyst was filtered off and the filtrate evaporated in vacuo. The residue was mixed up with water, filtered, dried and crystallized from chloroform. M.Pt. 126–128°C.

The following can be manufactured similarly:
0-amino-4-tolyl N-methylcarbamate, M.Pt. 112–115-°C,
2-amino-4-chlorphenyl N-methylcarbamate, M.Pt. 129–133°C, from
4-chlor-2-nitro-phenyl N-methylcarbamate, M.Pt. 106–110°C,
O-aminophenyl N,N-dimethylcarbamate, M.Pt. 63–64°C, from
O-nitrophenyl N,N-dimethylcarbamate (M.Pt. 56–57°C).

O-(1,1-dimethyl-2-propinyl-amino)phenyl-N-methylcarbamate 83 parts O-aminophenyl-N-methylcarbamate were suspended in 300 parts water in a nitrogen atmosphere. Then 5 parts of cuprous chloride and 62 parts 3-chloro-3-methyl-1-butine were added dropwise with stirring. By continuous addition of 5 percent caustic soda the mixture was kept at pH 4–5 and by cooling at about 20°C.

After the addition of the 3-chloro-3-methyl-1-butine was ended, the mixture was stirred for a further ½ hour at 20°C, and then treated with 300 volume parts of ether, brought to a pH of 7 with sodium bicarbonate solution and filtered through Celtite. The organic phase was separated, washed with water, dried over anhydrous sodium sulphate and evaporated to dryness.

After recrystallization, the O-(1,1-dimethyl-2-propinylamino)phenyl N-methyl carbamate was obtained with a melting point of 89–92°C.

Analogously there can be made:
O,(1,1-dimethyl-2-propinyl-amino)4-tolyl N-methylcarbamate,
2-(1,1-dimethyl-2-propinyl-amino) 4-chlorphenyl N-butylcarbamate M.Pt. 105–114°C,
O-(1-ethyl-1-methyl-2-propinyl-amino)4-tolyl N-methylcarbamate,
O-(1,1-dimethyl-2-propinyl-amino)phenyl N,N-dimethylcarbamate, M.Pt. 66–68°C.
1,2-dihydro-2,2-dimethyl-8-quinolyl-N-methylcarbamate. Active substance No. 1

30 parts O-(1,1-dimethyl-2-propinyl-amino)phenyl-N-methylcarbamate were dissolved in 150 volume parts ether and treated with 60 parts water, 1.5 parts copper powder, and 1.5 parts cuprous chloride. The mixture was boiled under reflux in a nitrogen atmosphere for about 70 hours, well stirred, and finally filtered through Celtite. The ethereal phase was separated, dried over anhydrous sodium sulphate and evaporated. The residue was chromatographed on silica gel. The material eluted with methylene chloride was crystallized from cyclohexane. M.Pt. 100–103°C.

EXAMPLE 2

2,2-dimethyl-1,2,3,4-tetrahydro-8-quinolyl-N-methylcarbamate. Active substance No. 2

30 parts, 1,2-dihydro-2,2-dimethyl-8-quinolyl-N-methylcarbamate were dissolved in 300 volume parts of dry dioxane. The solution was shaken in the presence of 1.5 parts 5 percent palladium carbon at 20–30-°C in a hydrogen atmosphere. After takeup of 3430 volume parts (normal conditions) of hydrogen, the hydrogenation rate dropped sharply. The solution was then filtered and evaporated. The residue was recrystallized once from alcohol/water. M.Pt. 111–116°C.

EXAMPLE 3

1,2-dihydro-2,2-dimethyl-1-(2-propinyl)-8-quinolyl N-methylcarbamate. Active substance No. 3

A mixture of 70 parts 1,2-dihydro-2,2-dimethyl-8-quinolyl N-methylcarbamate, 20 parts potassium iodide, 65 parts 2,6-lutidine and 150 volume parts dimethylformamide were warmed to 60°C in a nitrogen atmosphere, and treated with stirring with 108 parts propargyl bromide added in portions. The mix was stirred for 14 hours at 60°C, then cooled and treated with 500 volume parts ether and 200 parts water. The organic phase was separated, washed with 100 parts water, dried over anhydrous sodium sulphate, filtered and evaporated. The residue was crystallized from benzene-cyclohexane. M.Pt. 108–112°C.

EXAMPLE 4

1,2,3,4-tetrahydro-8-quinaldyl-N-methylcarbamate. Active substance No. 4

216 parts 8-quinaldyl-N-methylcarbamate were dissolved in 600 parts by volume glacial acetic acid and treated with 10 parts 10 percent palladium carbon. The mixture was shaken in a hydrogen atmosphere, until the amount of hydrogen required for the saturation of two double bonds had been taken up. The catalyst was filtered off and the filtrate evaporated in vacuo. The residue was dissolved in ether and washed with ice-cold caustic soda. The ethereal solution was evaporated and the residue chromatographed on silica gel. The material eluted with toluene and methylene chloride was crystallized from cyclohexane. M.Pt. 77–82°C.

EXAMPLE 5

1,2,3,4-tetrahydro-8-quinolyl-N-methylcarbamate. Active substance No. 5

Analogously to the way described in Example 2, 8-quinolyl-N-methylcarbamate was hydrogenated. The crude product was washed with soda solution and crystallized from toluene. M.Pt. 112–117°C.

EXAMPLE 6

1-cyanomethyl-1,2,3,4-tetrahydro-8-quinolyl-N-methylcarbamate. Active substance No. 6

To a solution of 52 parts 1,2,3,4-tetrahydro-8-quinolyl-N-methylcarbamate in 100 parts by volume dimethyl formamide and 33 parts 2,6-lutidine, at room temperature, there was added dropwise 51 parts iodoacetonitrile. The mixture was then kept at 50°C for 14 hours. The solution was diluted with 300 volume parts ether, washed thrice with water, dried and evaporated. The residue was crystallized from toluene. M.Pt. 113–118°C.

EXAMPLE 7

1-allyl-8-hydroxy-1,2,3,4-tetrahydroquinoline

A mixture of 97 parts 8-hydroxy-1,2,3,4-tetrahydroquinoline, 300 volume parts dimethyl formamide, 80 parts pyridine and 48 parts potassium iodide was treated at 40° with stirring with 83 parts allyl chloride added dropwise, and kept at 90°C for a few hours. The mix was evaporated in vacuo. The residue was treated with 500 parts each of ether and water. The organic phase was evaporated away with water and washed with 2N soda solution, and evaporated. The crystalline residue was mixed up with ether and filtered. The crude product melted at 69–77°C.

1-allyl-1,2,3,4-tetrahydro-8-quinolyl-N-acetyl-N-methylcarbamate Active substance No. 7

12 parts crude 1-allyl-8-hydroxy-1,2,3,4-tetrahydroquinoline were dissolved in 40 parts toluene and treated with 19.5 parts aqueous 40 percent trimethylamine solution. Into the solution, cooled to 0°C, there was added dropwise with stirring 17.8 parts N-acetyl-N-methyl-carbamic acid chloride. The mixture was then kept for 14 hours at room temperature.

The organic phase was separated, washed with 50 parts water and 50 parts 2N-caustic soda, dried over anhydrous sodium sulphate, filtered and evaporated. As residue, oily 1-allyl-1,2,3,4-tetrahydro-8-quinolyl-N-acetyl-N-methylcarbamate was obtained.

EXAMPLE 8

8-hydroxy-1-(2-propinyl)-1,2,3,4-tetrahydro-quinoline 60 parts propargyl chloride were added dropwise at 60°C with stirring to a stirred mixture of 97 parts 8-hydroxy-1,2,3,4-tetrahydroquinoline, 86 parts 2,6-lutidine, 35 parts potassium iodide and 300 parts by volume dimethyl formamide. The temperature of the mix was then held at 40°C for 2 hours. The mixture was cooled and treated with 500 parts by volume ether and 500 parts water. The organic phase was dried, washed with water and evaporated. The residue was diluted with methanol, precipitated with water and dried.

1-(2-propinyl)-1,2,3,4-tetrahydro-8-quinolyl-N-methylcarbamate. Active substance No. 8

54 parts crude 8-hydroxy-1-(2-propinyl)-1,2,3,4-tetrahydro quinoline and 0.2 parts triethylene diamine were dissolved in 200 parts by volume dioxane, and treated with 30 parts methyl isocyanate in portions, whereon the temperature rose to 40°C. The solution was kept at 40°C for 14 hours and then evaporated. The residue was chromatographed on silica gel. The product eluted with methylene chloride was crystallized from toluenehexane. M.Pt. 103–105°C.

EXAMPLE 9

8-hydroxy-1,2-dimethyl-1,2,3,4-tetrahydro-quinoline

In a nitrogen atmosphere at 70°C a stirred mixture of 147 parts 8-hydroxy-1,2,3,4-tetrahydroxyquinoline, 64 parts calcined sodium carbonate and 350 volume parts dimethyl formamide were treated with 151 parts dimethyl sulphate added dropwise. The mixture was then stirred for 14 hours at 90°C and then evaporated in vacuo. The residue was treated with 300 volume parts ether and 300 parts water. The ethereal phase was separated, washed twice with 200 parts water and several times with 10 percent caustic soda. The caustic soda extracts were purified and neutralized with concentrated hydrochloric acid. The product was extracted with ether and distilled under high vacuum. B.Pt. 76–80°C/0.035 mmHg.

In similar fashion, 8-hydroxy-1,2,3,4-tetrahydroquinaldine can be alkylated with the aid of the corresponding alkyl, alkenyl or alkinyl bromide or chloride with nitrogen. These intermediate products can be used further without purification.

1,2-dimethyl-1,2,3,4-tetrahydro-8-quinolyl-N-methylcarbamate. Active substance No. 9

68 parts 8-hydroxy-1,2-dimethyl-1,2,3,4-tetrahydroquinoline were dissolved in 200 parts by volume hexane, and treated with 0.2 parts triethylenediamine and with 36 parts methyl isocyanate added in portions, whereon an exothermic reaction took place. The mixture was kept at 40°C for 14 hours and then evaporated. The oily product was dried under high vacuum at 45°C.

EXAMPLE 10

8-hydroxy-2-methyl-1-n-propyl-1,2,3,4-tetrahydroquinoline

Analogously to the method described in Example 7, 8-hydroxy-1,2,3,4-tetrahydroquinoline was converted into 8-hydroxy 2-methyl-1-n-propyl-1,2,3,4-tetrahydroquinoline with n-propyl bromide. M.Pt. 102-–103°C/0.16 mmHg.

2-methyl-1-n-propyl-1,2,3,4-tetrahydro-8-quinolyl N,N-dimethylcarbamate. Active substance No. 10

40 parts 8-hydroxy-2-methyl-1-n-propyl-1,2,3,4-tetrahydroquinoline were dissolved in 100 parts by volume hexane, and treated with 31.8 parts 40 percent aqueous trimethylamine solution and dropwise with 23.1 parts dimethyl carbamic acid chloride. The temperature of the mixture was kept at 30°C for several hours, and the organic phase then separated off and evaporated in vacuo. Oily 2-methyl-1-n-propyl-1,2,3,4-tetrahydro-8-quinolyl N,N-dimethylcarbamate was obtained as residue.

In fashion similar to Examples 1–10 the following compounds were manufactured:

Active substance No.

11
  3-methyl-1,2,3,4-tetrahydro-8-quinolyl-N-methylcarbamate.
12
  4-methyl-1,2,3,4-tetrahydro-8-quinolyl-N-methylcarbamate.
13
  3,4-dimethyl-1,2,3,4-tetrahydro-8-quinolyl-N-methylcarbamate.
14
  5-methyl-1,2,3,4-tetrahydro-8-quinolyl-N-methylcarbamate.
15
  1,2,2-trimethyl-1,2-dihydro-8-quinolyl-N-methylcarbamate.
16
  1-allyl-2,2-dimethyl-1,2-dihydro-8-quinolyl-N-methylcarbamate. M.Pt. 72–76°C.
17
  2,2-dimethyl-1,2-dihydro-8-quinolyl-N,N-dimethylcarbamate. M.Pt. 74°C.
18
  2,2,5-trimethyl-1,2-dihydro-8-quinolyl-N-methylcarbamate. M.Pt. 97–103°C.
19
  2,2,5-trimethyl-1,2,3,4-tetrahydro-8-quinolyl-N-methylcarbamate. M.Pt. 133–138°C.
20
  2,5-dimethyl-2-ethyl-1,2-dihydro-8-quinolyl-N-methylcarbamate. M.Pt. 87–90°C.
21
  5-chlor-1,2-dihydro-2,2-dimethyl-8-quinolyl-N-methylcarbamate 94°C.
22
  1-ethyl-1,2,3,4-tetrahydro-8-quinolyl-N-methylcarbamate.
23
  1-allyl-1,2,3,4-tetrahydro-8-quinolyl-N-methylcarbamate. M.Pt. 68–72°C.
24
  1-cyanethyl-1,2,3,4-tetrahydro-8-quinolyl-N-methylcarbamate.
25
  1-(2-methoxyethyl)-1,2,3,4-tetrahydro-8-quinolyl-N-methylcarbamate.
26
  1-(3-chlorallyl)-1,2,3,4-tetrahydro-8-quinolyl-N-methylcarbamate. M.Pt. 74–78°C.
27
  1-(2-chlorallyl)-1,2,3,4-tetrahydro-8-quinolyl-N-methylcarbamate. M.Pt. 90°C.
28
  2-methyl-1-n-propyl-1,2,3,4-tetrahydro-8-quinolyl-N-methylcarbamate. M.Pt. 96–98°C
29
  1-n-butyl-2-methyl-1,2,3,4-tetrahydro-8-quinolyl-N-methylcarbamate. M.Pt. 58–61°C
30
  1-allyl-2-methyl-1,2,3,4-tetrahydro-8-quinolyl-N-methylcarbamate (oil).
31
  2-methyl-1-(2-propinyl)-1,2,3,4-tetrahydro-8-quinolyl-N-methylcarbamate. M.Pt. 90–92°C.
32
  1,2,3,4-tetrahydro-8-quinolyl-N,N-dimethylcarbamate.
33
  2-methyl-1,2,3,4-tetrahydro-8-quinolyl-N,N-dimethylcarbamate.
34
  6-methyl-1,2,3,4-tetrahydro-8-quinolyl-N-methylcarbamate.
35
  2,2-dimethyl-1,2-dihydro-8-quinolyl-N-acetyl-N-methylcarbamate.
36
  1-methyl-1,2,3,4-tetrahydro-8-quinolyl-N-acetyl-N-methylcarbamate.
37
  2,2-dimethyl-1-ethyl-1,2-dihydro-8-quinolyl-N-methylcarbamate.
38
  1-methylcyanato-1,2-dihydro-2,2-dimethyl-8-quinolyl-N-methylcarbamate.
39
  1-methylcyanato-1,2-dihydro-2,2-dimethyl-8-quinolyl-N,N-dimethylcarbamate.
40
  1-(2-chlorallyl)-1,2,3,4-tetrahydro-8-quinolyl-N,N-dimethylcarbamate.
41
  1-(2-chlorallyl)-1,2,3,4-tetrahydro-8-quinolyl-N-acetyl-N-methylcarbamate.
42
  1-propyl-1,2,3,4-tetrahydro-8-quinolyl-N-methylcarbamate.
43
  1-isopropyl-1,2,3,4-tetrahydro-8-quinolyl-N-methylcarbamate.

44
18 1-isopropyl-1,2,3,4-tetrahydro-8-quinolyl-N-methylcarbamate.
45 1-sec. butyl-1,2,3,4-tetrahydro-8-quinolyl-N-methylcarbamate.
46 18 1-ethyl-2-methyl-1,2,3,4-tetrahydro-8-quinolyl-N-methylcarbamate.
47 1-(n) butyl-2-methyl-1,2,3,4-tetrahydro-N,N-dimethylcarbamate.
48 18 2-methyl-5,7-dichlor-1,2,3,4-tetrahydro-N-methylcarbamate.

EXAMPLE 11

5 parts of active agent according to the invention and 5 parts of talcum were mixed and finely ground. By mixing in a further 90 parts of talcum, a 5 percent dusting powder was obtained as a starting mixture for a dilution row of active agent for testing against stored product pests or filter paper in glass dishes. 2 gm of this mixture per glass dish corresponds to 100 mg active substance/m$^2$.

By further 1:1 dilutions of the 5 percent dusting powder, 2.5, 1.25, 0.62, 0.31, 0.16 and 0.08 percent mixtures were obtained, which correspond to active substance concentrations of 50, 25, 12.5, 6.2, 3.1 and 1.5 mg active substance/m$^2$, if 2 g of the particular dust is used per glass dish.

Evaluation after 24 hours showed that the following minimum concentrations (mg active substance) were necessary for total kill of the corresponding pests.

| Active substance No. | Blatella germanica adults | Periplaneta americana L-5 | Blatta orientalis L-5 |
|---|---|---|---|
| 1 | 1.5 | 3 | — |
| 2 | 6 | 3 | 3 |
| 5 | — | 6 | 12 |
| 6 | — | 3 | 6 |
| 8 | — | 12 | 12 |
| 17 | 12 | — | — |
| 18 | 12 | — | — |
| 19 | 12 | 6 | — |
| 23 | — | 12 | — |
| 16 | 12 | — | — |

| Active substance No. | Tenebrio molitor Imago | Larven | Dermestes frischii Imago | Larven | Acheta domesticus L. | Sitophilus granarius Im. |
|---|---|---|---|---|---|---|
| 1 | 50 | 50 | — | — | 12 | 3 |
| 2 | 50 | — | 12 | 6 | 6 | 6 |
| 5 | — | — | 12 | 12 | 6 | — |
| 6 | — | — | — | 3 | 3 | — |
| 8 | — | — | — | 12 | — | — |
| 19 | — | — | — | — | 6 | — |
| 23 | — | — | — | — | 12 | — |

EXAMPLE 12

Action against *Aphis fabae*

Young *Vicia faba* plants of about 5 cm high were infected with plant parts from plants attached by *Aphis fabae*. After five days further growth of the plants and a corresponding increase in the number of aphids, the starting conditions for the active agent test were set up. The infested plants were sprayed from all sides with an emulsion of the active substances to be tested (contact action) or only from above in the direction of the shoot axis (penetration action). In the latter case, test animals sitting on the underside of the leaves were not subjected to the spray stream. If after two days 100 percent kill was obtained, then the plants were reinfested.

Results were as follows:

| Contact action No. | Penetration (ppm) | Compound Concentration | | |
|---|---|---|---|---|
| | | 2 days | 5 days | 2 days |
| 1 | 800 | 100 | 100 | 100 |
| | 400 | 100 | 100 | 100 |
| | 200 | 100 | 100 | 100 |
| | 100 | 100 | — | 80 |
| 2 | 800 | 100 | — | 100 |
| | 400 | 100 | — | 100 |
| | 200 | 100 | — | 100 |
| | 100 | 100 | — | 100 |

EXAMPLE 13 a. The test with *Epilachna varivestis*, the Mexican bean weevil was carried out as follows: 4–5 seedlings of *Phaseolus vulgaris* in the first leaf stage, in a flowerpot, were dipped in an emulsion of the test preparation and then allowed to dry. The test animals, L-4 stage of the weevils, were introduced into a cellophane bag which was then fixed over the treated plants with a rubber band. After 5 days the effect of the treatment was assessed by counting living and dead animals and counting the percentage kill.

| Concentration (ppm) | Active substance No. 1. | 2 | 6 | 22 | 30 | 46 |
|---|---|---|---|---|---|---|
| 800 | 100 | 100 | 100 | 100 | 100 | 100 |
| 400 | 100 | 100 | 100 | 100 | 100 | 100 |
| 200 | 100 | 100 | 100 | 100 | 100 | 100 |
| 100 | 100 | 100 | 100 | 80 | 60 | 80 | 80 | b. The test with Orgya gonostigma in the L-3 stage was analogously carried out with young mallow plants (*Malva silvestris*) as host plants. 5 larvae were used for each test. Evaluation took place after 2 and 5 days. If total mortality was present after 2 days, then the plants were reinfected. In this way any aging of the layer of active substance during the evaluation could be observed.

Results are shown in the following table.

| Comp. No. | Conc. (ppm) | After 2 days | After 5 days |
|---|---|---|---|
|   | 800 | 100 | 100 |
|   | 400 | 100 | 100 |
| 1 | 200 | 100 | 100 |
|   | 100 | 100 | 60 |
|   | 800 | 100 | 100 |
|   | 400 | 100 | 100 |
| 8 | 200 | 60 | 100 |
|   | 100 | 60 | 100 |
|   | 800 | 100 | 100 |
|   | 400 | 100 | 100 |
| 31 | 200 | 60 | 100 |
|   | 100 | 60 | 100 |
|   | 800 | 100 | 100 |
|   | 400 | 60 | 100 |
| 38 | 200 | — | 80 |
|   | 100 | — | 80 |
|   | 800 | 100 | 100 |
|   | 400 | 100 | 100 |
| 46 | 200 | 60 | 80 |
|   | 100 | 60 | 60 |

EXAMPLE 14

Action against beet bugs (*Rhodnius prolixus*). Acetonic solutions of active substance were so applied to petri dishes of 11 cm diameter that concentrates of 1 mg, 0.1 mg, 0.01 mg and 0.001 mg per dish were guaranteed. (1 mg per dish corresponds to 1 g per 9.4 m$^2$). 20 bugs in the L-3 stage were put on the active substance layer for 24 hours, the prepared dishes having been dried for 1 hour. Action was tested after 24 hours.

One repeat was done with a fresh dilution row. Full kill was obtained with the following minimum concentrations of various substances:

| Compound No. | Least concentration (mg/dish) |
|---|---|
| 1 | 0.01 |
| 2 | 0.01 |
| 17 | 0.01 |

EXAMPLE 15

Action against *Aedes aegypti*

Female mosquitoes (*Aedes aegypti*) were set on a layer of the test substance in petri dishes of 11 cm diameter for 6 hours. To make the layer 1 ml of an acetonic solution of the active substance was used and dried for 1 hour. Concentrations of 1000, 100, 10 and 1 ppm were used. These to application rates of 1, 0.1, 0.01 and 0.001 mg/dish.

Each 10 ice-cooled mosquito females were counted into the dishes. 4 repeats per concentration were conducted.

Active substances 1, 2, 4, 5, 7, 8, 10, 17, 19, 22, 23, 27, 28, 29, 30, 31, 42 and 46 show 100 percent kill at a concentration of 0.001 mg/dish.

EXAMPLE 16

A. *Rhipicephalus bursa*

Five adult ticks or 50 tick larvae were counted into a glass test tube and dipped for 1 to 2 minutes in 2 ml of an aqueous emulsion from a dilution row of 100, 10, 1 and 0.1 ppm test substance. The test tube was then closed by a standard cotton-wool plug and placed on its head, so that the emulsion of active substance was taken up by the cotton wool.

Evaluation took place for adults after 2 weeks and for larvae after 2 days. Each test was repeated twice. 100 percent kill was found at the following boundary concentrations.

| Active substance No. | Rhipicephalus bursa | |
|---|---|---|
|   | Adults | Larvae |
| 4 | 10 | 10 |
| 10 | 5 | 1 |
| 19 | 10 | 5 |
| 28 | 10 | 0.1 |
| 29 | 10 | 1 |

B. *Boophilus microplus* (Larvae)

With a similar dilution row as in test A, tests were carried out with 20 sensitive and 20 OP-resistant larvae (resistance concerned tolerance of diazinone). 100 percent kill was observed at the following boundary concentrations (ppm) after 2 weeks:

| Active substance No. | Boophilus microplus OP-resistant | (Larvae) sensitive |
|---|---|---|
| 4 | — | 1 |
| 7 | 5 | 1 |
| 10 | 10 | 10 |
| 19 | — | 1 |
| 28 | 10 | 1 |
| 29 | 10 | 1 |

EXAMPLE 17

Action against spider mites

Dwarf bean plants (*Phaseolus vulgaris*) in the two leaf stage were infected 12 hours before the application of active substance with spider mites by laying on attacked leaf pieces from a culture, so that after expiration of that time, a population was present on the plants in all stages of development. With the aid of a chromatography atomiser, the plants were then sprayed with the emulsified active substance until an even layer of droplets was present on the leaf surface. Evaluation took place after 2 and 7 days: the plant parts were inspected under a stereo microscope for reckoning the percentage kill.

In the following table, the percentage kill of the normally sensitive type *Tetranychus urticae* Koch are given.

| Active substance No. 2 | | | | |
|---|---|---|---|---|
| a) Action against Tetranychus urticae Kill in % | | | | |
|   | After 2 days | | After 7 days | |
| Conc. (ppm) | Larvae | Adults | Larvae | Adults |
| 800 | 100 | 100 | 100 | 100 |
| 400 | 100 | 100 | 100 | 100 |
| 200 | 60 | 60 | 100 | 80 |

I claim:

1. A compound of the formula

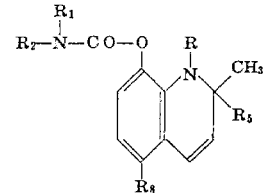

in which $R_1$ is hydrogen or methyl; $R_2$ is methyl or acetyl; $R_3$ is hydrogen, methyl, allyl, 2-propynyl or methyl cyanato; $R_5$ is methyl or ethyl; and $R_8$ is hydrogen, methyl or chlorine.
2. The compound
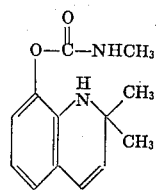
3. The compound
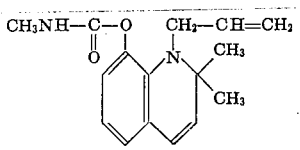
4. The compound
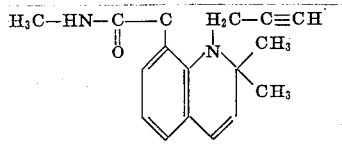
5. The compound
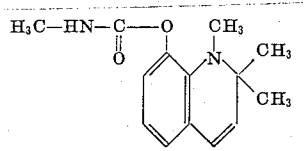
6. The compound
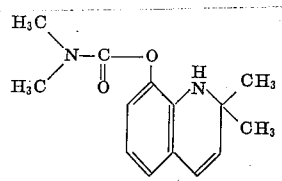
7. The compound
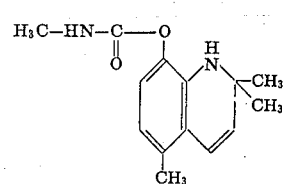
8. The compound
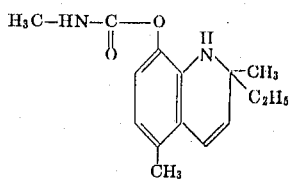
9. The compound
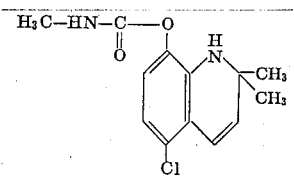
10. The compound
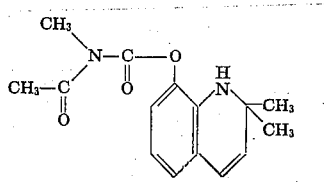
11. The compound
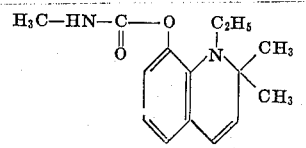
12. The compound
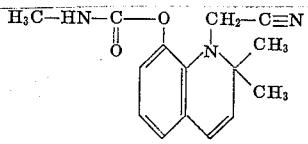
13. The compound
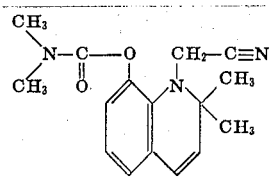
* * * * *

UNITED STATES PATENT OFFICE
CERTIFICATE OF CORRECTION

Patent No. 3,818,012      Dated June 18, 1974

Inventor(s) Erwin Nikles

It is certified that error appears in the above-identified patent and that said Letters Patent are hereby corrected as shown below:

Column 20, claim 1, line 63, in the formula, delete "R" and substitute -- $R_3$ --.

Signed and sealed this 18th day of February 1975.

(SEAL)
Attest:

RUTH C. MASON
Attesting Officer

C. MARSHALL DANN
Commissioner of Patents
and Trademarks